(12) United States Patent
Kim et al.

(10) Patent No.: US 9,516,611 B2
(45) Date of Patent: Dec. 6, 2016

(54) USER EQUIPMENT AND POWER CONTROL METHOD FOR RANDOM ACCESS

(75) Inventors: Youngbum Kim, Seoul (KR); Jinkyu Han, Seoul (KR); Younsun Kim, Gyeonggi-do (KR); Juho Lee, Gyeonggi-do (KR); Joon Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 166 days.

(21) Appl. No.: 13/402,459

(22) Filed: Feb. 22, 2012

(65) Prior Publication Data

US 2012/0214538 A1 Aug. 23, 2012

(30) Foreign Application Priority Data

Feb. 22, 2011 (KR) .................. 10-2011-0015602
Jan. 26, 2012 (KR) .................. 10-2012-0007868

(51) Int. Cl.
*H04W 52/50* (2009.01)
*H04W 52/24* (2009.01)
*H04W 52/32* (2009.01)

(52) U.S. Cl.
CPC .......... *H04W 52/50* (2013.01); *H04W 52/242* (2013.01); *H04W 52/325* (2013.01)

(58) Field of Classification Search
CPC ............... H04W 74/0833; H04W 74/0866; H04W 72/042; H04W 72/085; H04W 52/325; H04W 52/242; H04W 52/04; H04W 52/245; H04W 52/24
See application file for complete search history.

(56) References Cited

U.S. PATENT DOCUMENTS 7,983,294 B2     7/2011   Kim et al.
8,570,959 B2 *   10/2013   Ishii ............................... 370/329
2001/0040880 A1   11/2001   Chen et al.
2002/0071395 A1 *   6/2002   Redi et al. ..................... 370/252
2008/0188265 A1 *   8/2008   Carter et al. ................... 455/561
2009/0176525 A1 *   7/2009   Wang .................. H04W 52/146
                                                                                 455/522
2010/0093386 A1 *   4/2010   Damnjanovic et al. ...... 455/522
(Continued)

FOREIGN PATENT DOCUMENTS

CN         101867457       10/2010
CN         101873601       10/2010
(Continued)

OTHER PUBLICATIONS

NPL, R1-102832 TI Outdoor Hotzone Cell Selection, May 2010.*
NTT DOCOMO et al., "Higher Layer Signaling of CSI-RS and Muting Configurations", R2-110607, 3GPP TSG-RAN WG2 Meeting #72bis, Jan. 25, 2011.
Russian Office Action dated Oct. 30, 3015 issued in counterpart Appln. No. 2013139025/07, 16 pages.
NTT DoCoMo et al., "L1 eNB Measurements on PRACH Resources", R1-080159, 3GPP TSG RAN WG1 Meeting #51bis, Jan. 14-18, 2008, 4 pages.
Huawei, "CSI-RS Pattern Signalling", R1-104290, 3GPP TSG RAN WG1 Meeting #62, Aug. 23-27, 2010, 6 pages.
(Continued)

*Primary Examiner* — Wesley Kim
*Assistant Examiner* — Dong-Chang Shiue
(74) *Attorney, Agent, or Firm* — The Farrell Law Firm, P.C.

(57) ABSTRACT

An improved power control method and apparatus of a mobile terminal is provided for facilitating random access procedure in a mobile communication system based on a distributed antenna system. A method includes receiving, by the terminal, system information from a base station, the system information including transmit power information for transmitting a random access preamble; calculating a transmit power using the transmit power information; and transmitting the random access preamble using with the calculated transmit power.

18 Claims, 14 Drawing Sheets

(56) References Cited

U.S. PATENT DOCUMENTS

| | | | |
|---|---|---|---|
| 2010/0232318 A1* | 9/2010 | Sarkar | H04W 28/18 370/254 |
| 2011/0034175 A1 | 2/2011 | Fong et al. | |
| 2011/0038302 A1 | 2/2011 | Papasakellariou et al. | |
| 2011/0039499 A1* | 2/2011 | Zhang et al. | 455/67.11 |
| 2011/0159802 A1 | 6/2011 | Binti Harum et al. | |
| 2011/0194551 A1* | 8/2011 | Lee | H04B 7/0626 370/342 |
| 2012/0038521 A1* | 2/2012 | Zhu | H04B 17/318 343/703 |
| 2012/0076042 A1* | 3/2012 | Chun et al. | 370/252 |
| 2012/0115521 A1 | 5/2012 | Tong et al. | |
| 2013/0040676 A1* | 2/2013 | Kang et al. | 455/509 |
| 2013/0148533 A1 | 6/2013 | Li et al. | |

FOREIGN PATENT DOCUMENTS

| | | |
|---|---|---|
| EP | 1 641 299 | 3/2006 |
| EP | 2 111 051 | 10/2009 |
| GB | 2472362 | 2/2011 |
| KR | 1020070023484 | 2/2007 |
| KR | 1020080039177 | 5/2008 |
| KR | 1020080073192 | 8/2008 |
| RU | 2 267 222 | 12/2005 |
| RU | 2009 120 480 | 6/2009 |
| WO | WO 2009/110176 | 9/2009 |
| WO | WO 2010/143851 | 12/2010 |

OTHER PUBLICATIONS

Texas Instruments, "Outdoor Hotzone Cell Performance: a Cell Selection Analysis", R1-102832, 3GPP TSG RAN WG1 #61, May 10-14, 2010, 17 pages.

Nokia Siemens Networks et al., "PC of RACH Message 3", R1-083096, 3GPP TSG-RAN WG1 Meeting #53bis, Aug. 18-22, 2008, 9 pages.

Nokia et al., Proposed Response to RAN2 LS on Signaling for DL Data Arrival (R2-074575), R1-074857, 3GPP TSG RAN WG1 #51 Meeting, Nov. 5-9, 2007, 2 pages.

Etri, "C-RNTI Allocation in Initial Access", R2-062444, 3GPP TSG RAN WG2 #54, Aug. 28-Sep. 1, 2006, 2 pages.

Japanese Office Action dated Nov. 16, 2015 issued in counterpart Appln. No. 2013-555363, 8 pages.

3rd Generation Partnership Project; Technical Specification Group Radio Access Network; Evolved Universal Terrestrial Radio Access (E-UTRA); Physical Layer Procedures (Release 10), 3GPP TS 36.213 V10.0.1, Chapter 6, Dec. 2010, 3 pages.

European Search Report dated Mar. 8, 2016 issued in counterpart Appln. No. 12156460.3-1855, 13 pages.

Chinese Office Action dated Mar. 22, 2016 issued in counterpart Appln. No. 201280009751.9, 11 pages.

\* cited by examiner

USER EQUIPMENT AND POWER CONTROL METHOD FOR RANDOM ACCESS

PRIORITY

This application claims priority under 35 U.S.C. §119(a) to Korean Application Ser. No. 10-2011-0015602, which was filed in the Korean Intellectual Property Office on Feb. 22, 2011, and Korean Application Serial No. 10-2012-0007868, which was filed in the Korean Intellectual Property Office on Jan. 26, 2012, the content of each of which is incorporated herein by reference.

BACKGROUND OF THE INVENTION

1. Field of the Invention

The present invention relates generally to a mobile terminal and power control method for random access of the mobile terminal, and in particular, to a power control method and apparatus of a mobile terminal that facilitates a random access procedure in a distributed antenna mobile communication system.

2. Description of the Related Art

FIG. 1 illustrates a conventional cellular mobile communication system including three cells, each centered around a transmit/receive antenna, i.e., the transmit/receive antenna is located at the center of each cell. The cells are commonly referred to as a Central Antenna System (CAS). Even when multiple antennas are provided, all of these antennas are arranged at the center of the cell to define the service area.

Referring to FIG. 1, each of cells 100, 110, and 120 is centered around an antenna (or centrally located antennas) 130 associated with an evolved Node B (eNB). The eNB serves first and second User Equipment (UEs) 140 and 150 within cells 100, 110, and 120 to provide mobile communication service. Specifically, within cell 100, i.e., the service area of the eNB using the antenna 130, the first UE 140 is served at comparatively lower data rate than the second UE 150, because the first UE 140 is farther from the antenna 130 than the second UE 150.

In a mobile communication system implemented with the CAS-based antenna formation as illustrated in FIG. 1, each eNB transmits reference signals for a UE to measure a downlink channel state and modulate downlink signals. For 3$^{rd}$ Generation Partnership Project (3GPP) Long Term Evolution-Advanced (LTE-A), the UE estimates channel with DeModulation Reference Signal (DM-RS) and measures a channel state between the eNB and the UE based on Channel Status Information Reference Signal (CSI-RS), the DM-RS and CSI-RS being transmitted by eNB.

FIG. 2 illustrates a conventional resource block including CSI-RSs transmitted by an eNB. Specifically, FIG. 2 illustrates a downlink reference signal structure with a DM-RS and a CSI-RS transmitted from an eNB to a UE in an LTE-A system.

Referring to FIG. 2, the x axis is the time axis, and the y axis is the frequency axis. A minimum transmission unit in the time domain is an Orthogonal Frequency Division Multiplxing (OFDM) symbol, and a subframe 224 includes two slots 222 and 223, each including NsymbolDL symbols. A minimum transmission unit in the frequency domain is a subcarrier, and the system frequency band is divided into a total of NBW subcarriers. A basic unit of a time-frequency resource is a Resource Element (RE), which is defined by an OFDM symbol index and a subcarrier index. A Resource Block (RB) 220 or 221 is defined with NsymbolDL contiguous OFDM symbols in the time domain and NSCRB contiguous subcarriers in the frequency domain. That is, one RB includes NsymbolDL x NSCRB REs. A minimum transmission unit of normal data or control information is a RB.

In FIG. 2, the downlink control channel is transmitted in the first three OFDM symbols at the beginning of the subframe 224. A Physical Downlink Share Channel (PDSCH) is transmitted on the remaining resources, after those allocated for the downlink control channel in the subframe. The DM-RS is the reference signal that is referenced by a UE to demodulate the PDSCH.

The RB of FIG. 2 is designed to transmit strings for two CSI-RS antenna powers at the positions denoted by reference numbers 200 to 219. Specifically, numbers 200 to 219 denote the positions paired for the signals of two CSI-RS antenna ports. Accordingly, the eNB transmits the downlink estimation signals for the two CSI-RS antenna ports at the position 200.

An antenna port is a logical concept, such that CSI-RS is logically defined per CSI-RS antenna port for channel status measurements of a respective CSI-RS antenna port. If the same CSI-RS is transmitted through multiple physical antennas, the UE cannot discriminate among the physical antennas but just recognizes a single antenna port.

In a mobile communication systems including a plurality of cells, as illustrates in FIG. 1, it is possible to transmit a CSI-RS at cell-specific location, as illustrated in FIG. 2.

For example, the CSI-RS can be transmitted at position 200 in cell 100, the CSI-RS is transmitted at position 205 in cell 110, and the CSI-RS can be transmitted at position 210 in cell 120. Basically, the cells are assigned different time-frequency resources for the CSI-RS in order to avoid interference between the CSI-RSs of different cells.

In a CAS as illustrated in FIG. 1, however, the antennas of each eNB are concentrated at the center of cells limiting the ENBs abilities to provide a high data rate service to a UE located far from the center of the cell.

FIG. 3 illustrates a conventional mobile communication system configured with both a CAS and a Distributed Antenna System (DAS).

Referring to FIG. 3, the mobile communication system includes cells 300, 310, and 320. As illustrated in more detail, the first cell 300 includes a central antenna 330 and four distributed antennas 360, 370, 380, and 390. The central antenna 330 and the distributed antennas 360, 370, 380, and 390 are connected each other and controlled by a central controller of an eNB.

The central antenna 330 provides mobile communication service to first and second UEs 340 and 350 located in the first cell 300. However, because the first UE 340 is located farther from the central antenna 330 than the second UE 350, the first UE 340 is served by the eNB at a comparatively lower data rate than the second UE 350.

Typically, as the propagation path of the signal elongates, received signal quality degrades. By deploying a plurality of distributed antennas 360, 370, 380, and 390 within the cell 300 and providing the first and second UEs 340 and 350 with the mobile communication service through the distributed antennas 360, 370, 380, and 390, selected according to the locations of the first and second UEs 340 and 350, it is possible to improve the data rate. For example, the first UE 340 communicates through distributed antenna 390, which provides the best channel environment for the first UE 340, and the second UE 350 communicates through distributed antenna 360, which provides the best channel environment for the second UE 350. Accordingly, each of the first and second UEs 340 and 350 may be served by the eNB at a high data rate.

Normally, the central antenna 330 supports normal mobile communication services, service not characterized as high speed data services, and the mobility of the first and second UEs 340 and 350 crossing the boundaries of the cells 300, 310, and 320. Each of the central and distributed antennas may include a plurality of antenna ports.

FIG. 4 illustrates a conventional mobile communication system configured with central antennas distributed throughout a cell.

Referring to FIG. 4, the mobile communication system includes a plurality of cells 400, 410, and 420, each cell including a plurality of central antennas 430, 431, 432, 433, and 434 distributed throughout the cell and a plurality of distributed antennas 460, 470, 480, and 490 distributed in the cell. The central antennas 430, 431, 432, 433, and 434 are provide first and second UEs 440 and 450 with normal mobile communication services, i.e., those not characterized as high speed data services, and support mobility of the first and second UEs 440 and 450 roaming across the cells 400, 410, and 420. The distributed antennas 460, 470, 480, and 490 provide high speed mobile communication services.

In the following description, the logical concepts of a Central antenna port (C-port) and a Distributed antenna port (D-port) are defined such that the central and distributed antennas can be discriminated logically from each other regardless of their physical configurations.

The C-port defines a CSI-RS to support CAS for each antenna port, such that a UE can measure a channel status for each antenna port of the C-port. The CSI-RS transmitted through the C-port covers an entire area of a cell.

The D-port defines a CSI-RS to support a DAS for each antenna port, such that a UE can measure a channel status for each antenna port of the D-port. The CSI-RS transmitted through the D-port covers a local area within the cell. However, if the same CSI-RS is transmitted through multiple antennas, the UE cannot discriminate between the antennas located at different positions, but instead identifies the same antenna port.

For example, in FIG. 3, if the third and fourth antennas 380 and 390, which are located far from each other, transmit CSI-RS #1 and CSI-RS #2, each having different patterns, the first UE 340 can measure the channel state between the third distributed antenna 380 and the first UE 340 based on the CSI-RS #1 and the channel state between the fourth distributed antenna 390 and the first UE 340 based on the CSI-RS #2. In this case, the third distributed antenna 380 is referred to as D-port #1, and the fourth distributed antenna 390 is referred to as D-port #2. If the third and fourth distributed antennas 380 and 390 transmit the CSI-RS #3 having the same pattern, the first UE 340 cannot discriminate between the third and fourth distributed antennas 380 and 390 using the CSI-RS #3. The first UE 340 measures the channel states between the first UE 340 and the distributed antennas 380 and 390 using CSI-RS #3. In this case, the combination of the third and fourth antennas 380 and 390 is referred to as a D-port #3.

The time-frequency resources for transmitting C-port CSI-RS and D-port CSI-RS are allocated so as not to overlap with each other, thereby avoiding interference.

In attempting an initial connection to the LTE-A system, a UE performs a cell search to acquire downlink timing and frequency synchronization and a cell IDentifier (ID). Thereafter, the UE acquires basic parameters related to communication, e.g., a system bandwidth in the system information transmitted by the eNB. The UE then performs a random access process to transition to a connected state on a link to an eNB.

FIG. 5 is a signal flow diagram illustrating a random access process in a conventional mobile communication system.

Referring to FIG. 5, a UE transmits a random access preamble to an eNB in step 501. The eNB measures the propagation delay between the UE and eNB and acquires uplink synchronization. The UE selects a random access preamble randomly in a given random access preamble set. The initial transmit power of the random access preamble is determined using a pathloss between the eNB and the UE, as measured by the UE.

In step 502, the eNB transmits a time alignment command to the UE based on the propagation delay measured in step 501. The eNB also transmits scheduling information including uplink resource information and a power control command. If no scheduling information (a random access response) is received from the eNB, the UE repeats step 501.

In step 503, the UE receives uplink data (message 3) including a UE ID to the eNB using the uplink resource allocated in step 502. The transmit timing and transmit power of the UE is determined according to the command received from the eNB in step 502.

In step 504, if the eNB determines that the UE has performed the random access process without collision with other UEs, the eNB transmits, to the UE, the data (message 4) including the ID of the UE. When the message 4 is received from the eNB, the UE determines that the random access has completed successfully. When the random access has completed successfully, the UE configures an initial transmit power of an uplink data channel and/or control channel based on the UE transmit power controlled through the random access.

However, if message 3 transmitted by the UE, e.g., collides with data transmitted by another UE, such that the eNB fails receiving the message 3, the eNB stops transmitting data. Further, if message 4 is not received within a predetermined time, the UE determines that the random access has failed, and then repeats step 501.

SUMMARY OF THE INVENTION

The present invention has been made in an effort to solve at least the above-described problems occurring in the related art, and to provide at least the following advantages.

Accordingly, an aspect of the present invention is to provide a method for determining the random access preamble transmit power in a random access process of the UE in the system configured with DAS or DAS and CAS.

Another aspect of the present invention is to provide a method and apparatus for controlling transmit power for random access of the UE in the LTE-A system based on DAS.

In accordance with an aspect of the present invention, a power saving method for random access of a terminal in a mobile communication system includes receiving, by the terminal, control information from a base station, the control information including transmit power information for transmitting a random access preamble; calculating a transmit power using the transmit power information; and transmitting the random access preamble using with the calculated transmit power.

In accordance with another aspect of the present invention, an apparatus for controlling transmit power in a mobile terminal includes a receiver that receives control information from a base station, the control information including transmit power information for transmitting a random access preamble; a power control controller that controls a random access preamble transmit power using the transmit power information; and a transmitter that transmits the random access preamble with the controlled random access preamble transmit power.

In accordance with another aspect of the present invention, a random access method of a base station in a mobile communication system includes transmitting, by the base station to a terminal, control information including transmit power information for transmitting a random access preamble; receiving a random access preamble from the terminal; transmitting a random access response to the terminal, in response to the random access preamble; receiving uplink data including a terminal identifier from the terminal; and transmitting data including the terminal identifier to the terminal.

In accordance with still another aspect of the present invention, a base station that performs random access in a mobile communication system includes a transceiver that transceives signals with a terminal; and a power control controller that transmits control information including transmit power information for transmitting a random access preamble, receives the random access preamble from the terminal, transmits, a random access response to the terminal, receives uplink data including a terminal identifier from the terminal, and transmits data including the terminal identifier to the terminal.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Various embodiments of the present invention are described in detail below with reference to the accompanying drawings. Detailed descriptions of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although embodiments of the present invention will be described herein with reference to LTE-A (or Advanced Evolved Universal Terrestrial Radio Access (EUTRA)) by way of example, it will be understood by those skilled in the art that the embodiments of the present invention can be applied to other communication systems having similar technical backgrounds and channel formats, with slight modifications, without departing from the spirit and scope of the present invention.

In accordance with an embodiment of the present invention, a random access method of a UE is provided through a link having a best channel quality among multiple links between the UE and individual antenna ports in a DAS or combination DAS/CAS.

In the random access process, the UE calculates a transmit power for transmitting a random access preamble using a reference antenna transmit power information received from an eNB. The reference antenna transmit power information includes channel state reference signals for calculating a pathloss between the UE and individual antennas, and a power adjustment parameter of a nearest antenna.

In accordance with an embodiment of the present invention, a method is provided for efficiently minimizing UE random access preamble transmit power, thereby reducing UE power consumption and interference.

Figure 1:
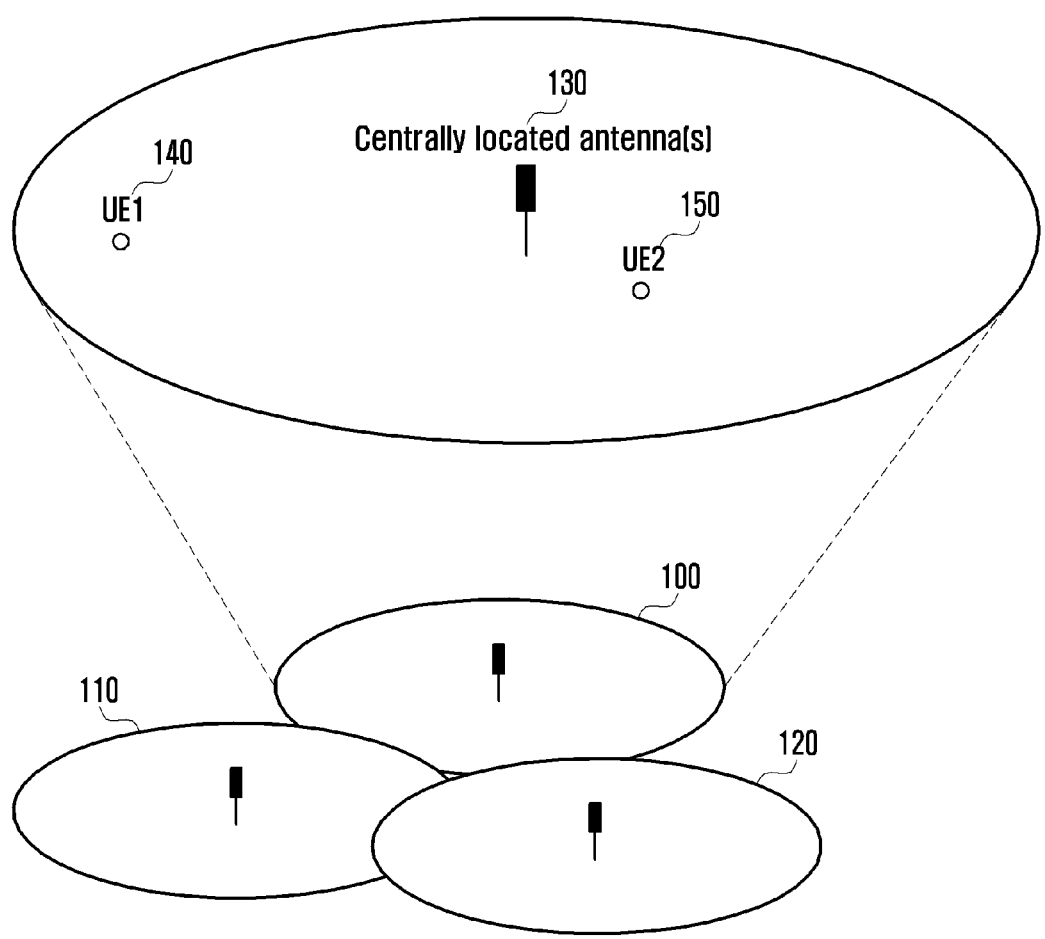
FIG. 1 illustrates a conventional cellular mobile communication system including three cells, each centered around a transmit/receive antenna.
Figure 2:
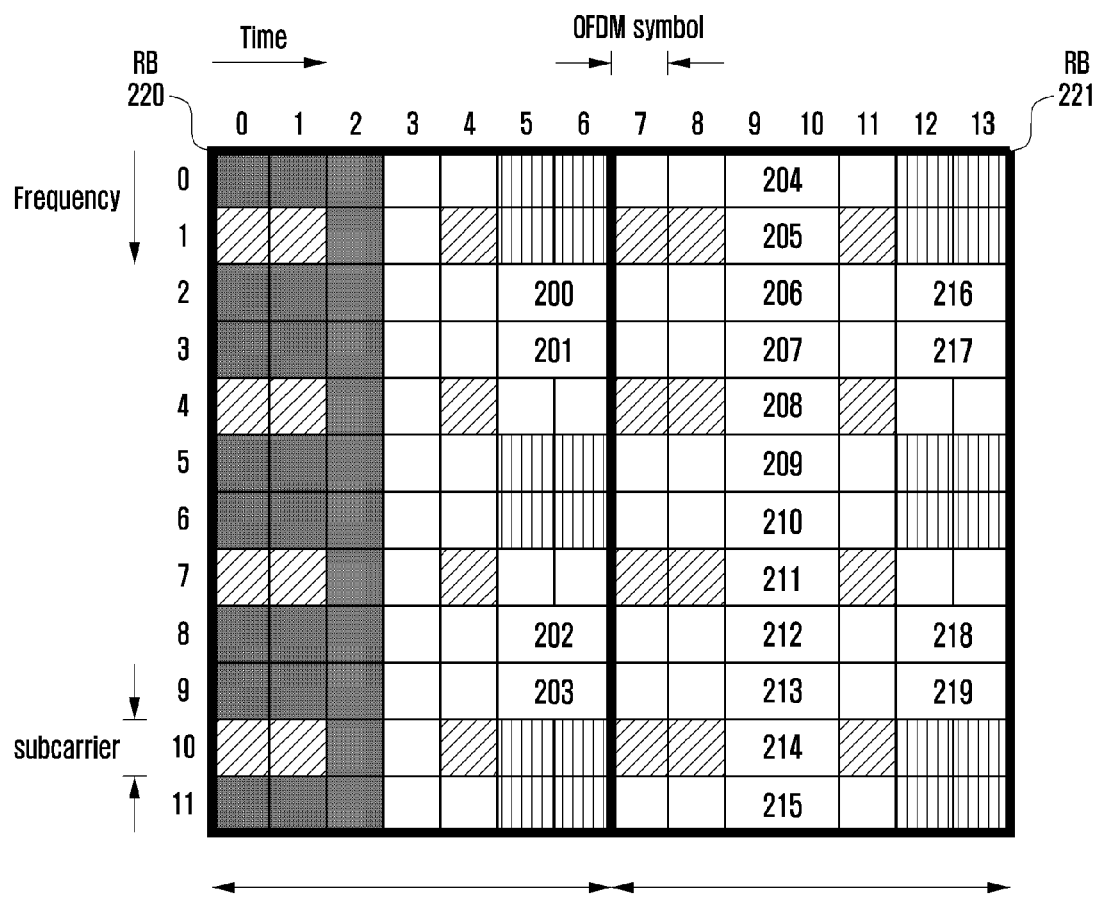
FIG. 2 illustrates a conventional resource block including CSI-RSs transmitted by an eNB.
Figure 3:
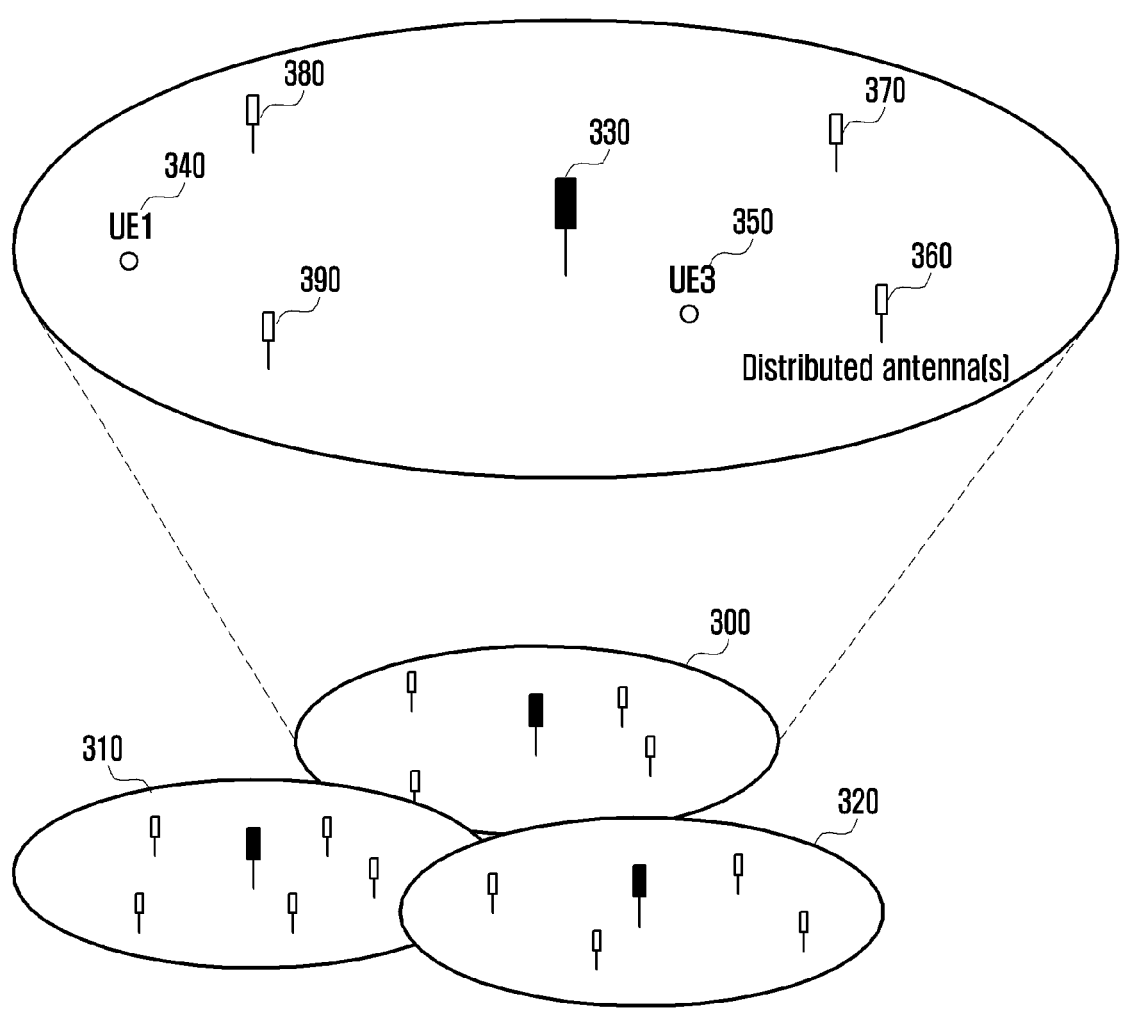
FIG. 3 illustrates a conventional mobile communication system configured with both CAS and DAS.
Figure 4:
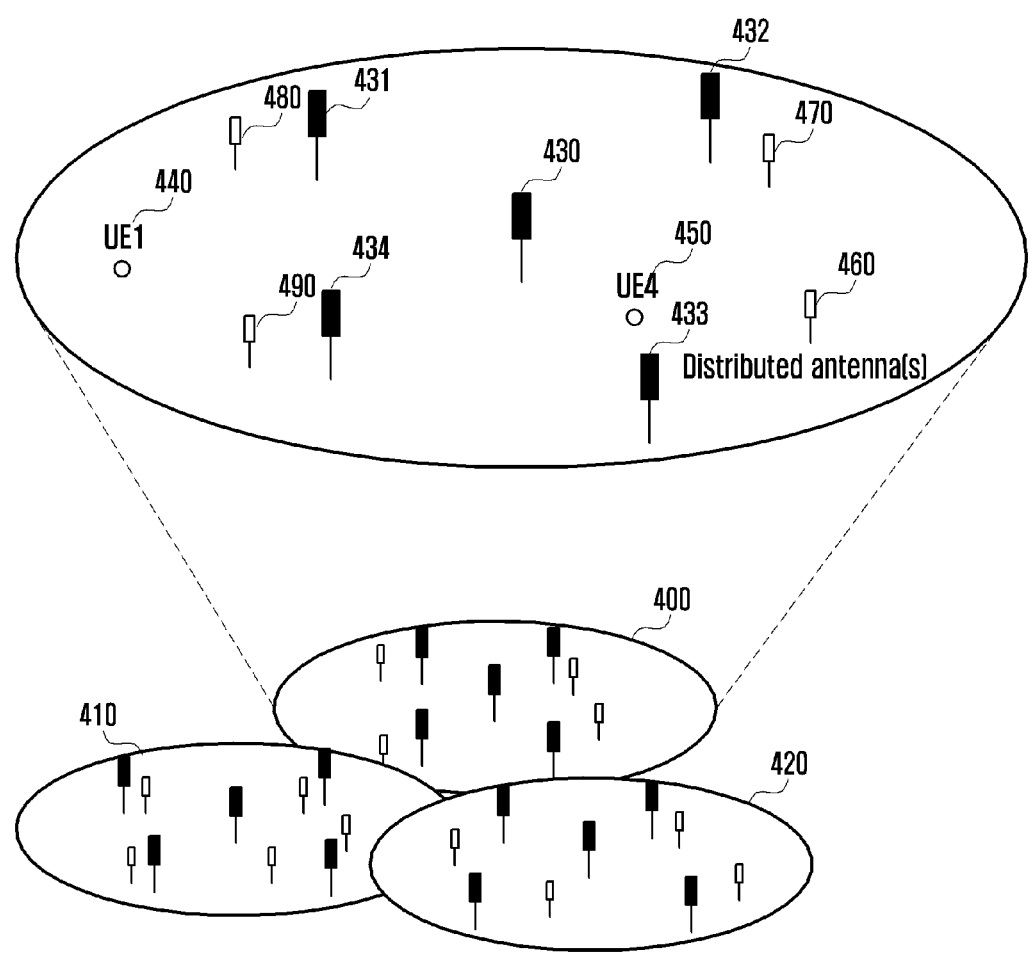
FIG. 4 illustrates a conventional mobile communication system configured with central antennas distributed throughout a cell
Figure 5:
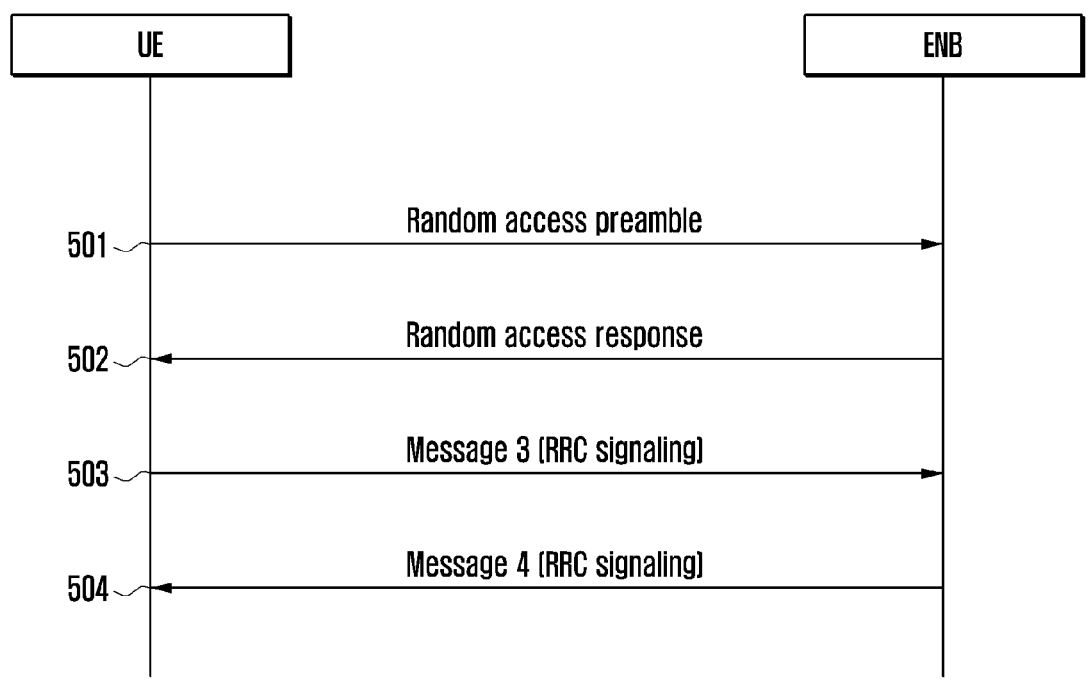
FIG. 5 is a signal flow diagram illustrating a random access process in a conventional mobile communication system.
Figure 6:
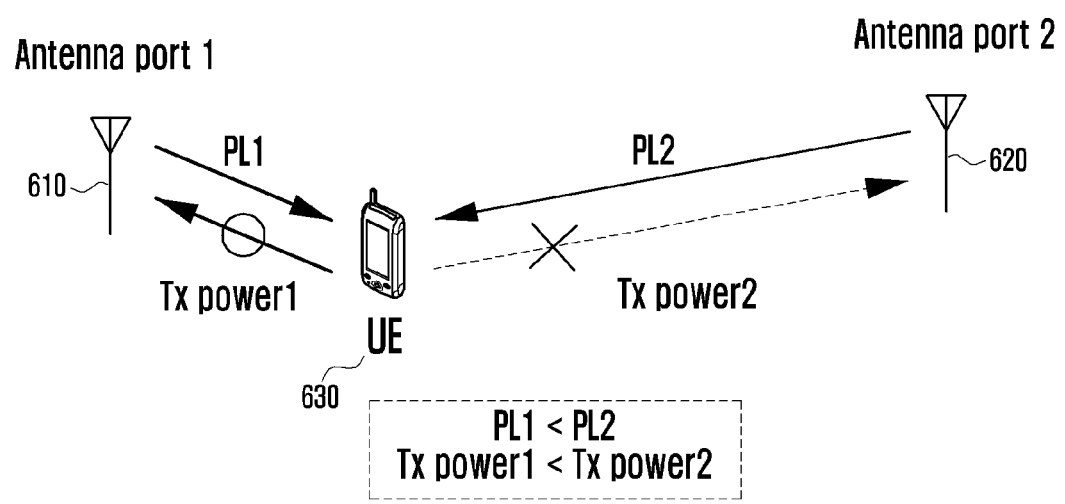
FIG. 6 illustrates a power control method according to an embodiment of the present invention.

FIG. 6 illustrates a power control method according to an embodiment of the present invention.

Referring to FIG. 6, the first and second antennas 610 and 620 are distributed within a cell, a pathloss between the UE 630 and the first antenna 610 is PL1 and a pathloss between the UE 630 and the second antenna 620 is PL2. If the PL1 is less than the PL2 (PL1<PL2), the channel state between the UE 630 and the first antenna 610 is better than the channel state between the UE 630 and the second antenna 620.

The first and second antennas 610 and 620 operate with CSI-RSs defined respectively such that the UE 630 can measure a channel state per antenna. The first and second antennas 610 and 620 can be referred to as antenna ports 1 and 2, respectively, in logical concept. Accordingly, if the same CSI-RS is transmitted through multiple physical antennas, the UE 630 cannot discriminate among the antennas but recognizes the physical antennas as one antenna port.

The pathloss is a criterion indicating whether the channel state is good or bad; the greater the pathloss, the worse the channel state. The pathloss has a small time-varying characteristic. Typically, the UE calculates pathloss using an RS transmitted by the eNB, as shown in Equation (1).

$$PL = \text{referenceSignalPower} - \text{RSRP} \qquad (1)$$

In Equation (1), PL represents pathloss, referenceSignalPower denotes an RS transmit power signaled by the eNB, and Reference Signal Received Power (RSRP) denotes a received signal strength of the RS, as measured by the UE.

As the pathloss increases, the UE increases the transmit power to overcome the worsening channel condition. However, a high UE transmit power increases power consumption and increases interference, negatively affecting system performance. In a DAS-based mobile communication system, UE power consumption and interference can be reduced, if the UE transmit power can be controlled by selecting a link having a best channel condition among multiple links established between the UE and multiple antennas.

Figure 7:
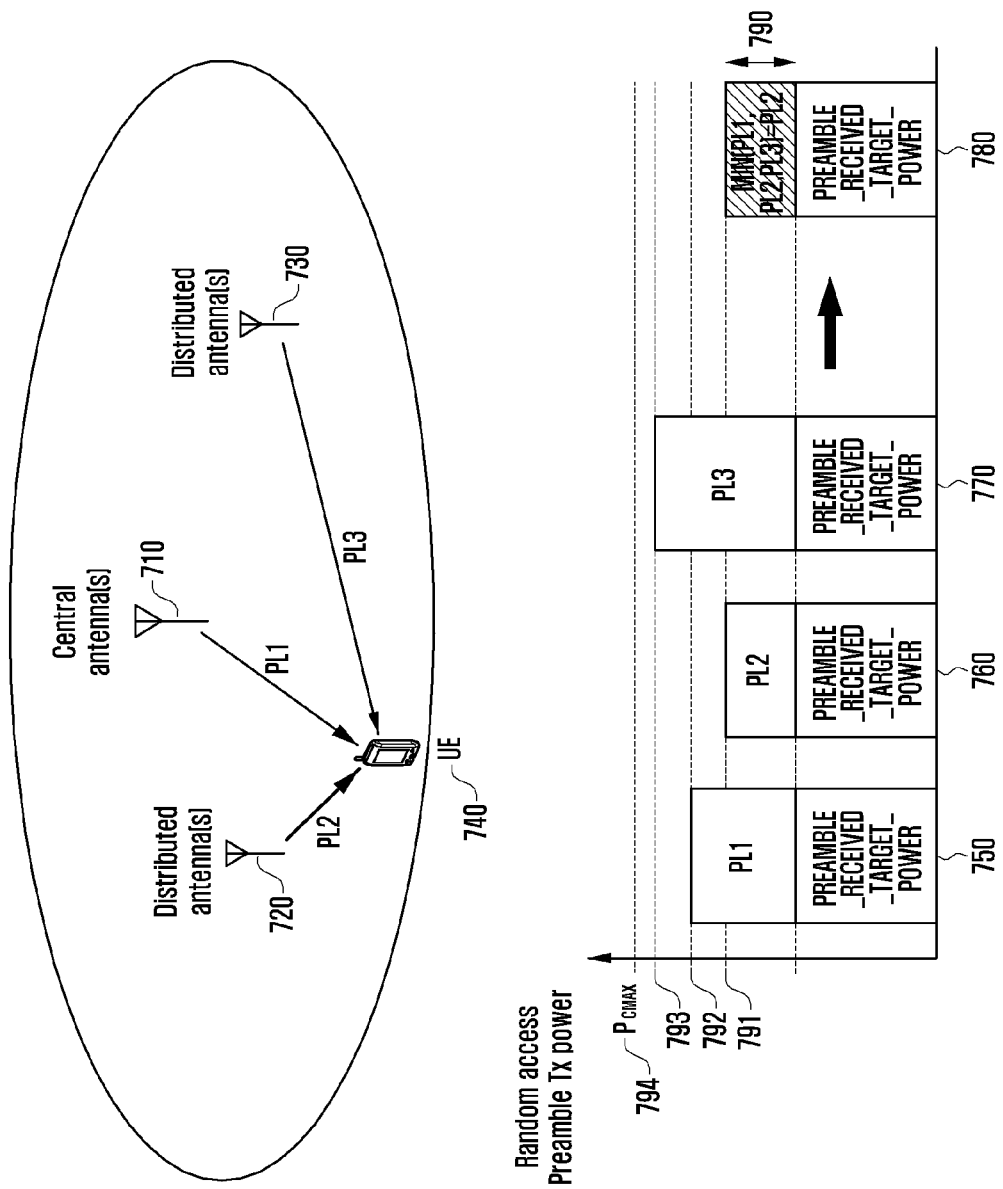
FIG. 7 illustrates a transmit power control method in a mobile communication system according to an embodiment of the present invention.

FIG. 7 illustrates a transmit power control method in a mobile communication system according to an embodiment of the present invention. Specifically, FIG. 7 illustrates a pathloss-adaptive random access preamble transmit power configuration method.

Referring to FIG. 7, a cell includes a central antenna 710 and first and second distributed antennas 720 and 730 for communication with a UE 740. Here, it is assumed that the central antennal 710 and the first and second antennas 720 and 730 transmit a CSI-RS in different patterns, respectively. Because the CSI-RS is transmitted in different patterns, the UE 740 can measure the channel state for each antenna.

In FIG. 7, it is assumed that the central antenna 710 and the first and second distributed antennas 720 and 730 are mapped to C-port, D-port #1, and D-port #2, respectively. Also, it is assumed that the central antenna 710 and the first and second distributed antennas 720 and 730 are connected to the central controller of the eNB.

The UE 740 is nearest to the first distributed antenna 720 and farthest from the second distributed antenna 730. Therefore, assuming that there are no obstacles between the UE 740 and the antennas 710, 720, and 730, the antennas have a pathloss relationship of PL2<PL1<PL3, where PL1 is the pathloss between the UE 740 and the central antenna 710, PL2 is the pathloss between the UE 740 and the first distributed antenna 720, and PL3 is the pathloss between the UE 740 and the second distributed antenna 730. The UE can measures the pathloss per antenna using the antenna-specific CSI-RS.

In an LTE-A system operating in a CAS mode, the UE's random access preamble transmit power ($P_{PRACH}$) is expressed in units of dBm, as shown in Equation (2).

$$P_{PRACH} = \min\{P_{CMAX}, \text{PREAMBLE\_RECEIVED\_TARGET\_POWER} + PL\} \text{ [dBm]} \qquad (2)$$

In Equation (2), PCMAX represents a maximum UE output power based on a UE class and higher layer signaling configuration, PREAMBLE_RECEIVED_TARGET_POWER represents a random access preamble reception power required for the eNB to receive the random access preamble, determined based on the higher layer signal parameters, and PL represents the pathloss between eNB and UE.

In a DAS mode, however, the transmit/receive antennas of the eNB are distributed such that the PLs between the UE 740 and the respective antennas 710, 720, and 730 are different from each other.

In FIG. 7, reference numbers 750, 760, and 770 denote PREAMBLE_RECEIVED_TARGET_POWER values obtained by applying the PLs between the UE 740 and the respective antennas 710, 720, and 730 to Equation (2) for a CAS mode transmit power calculation. The calculated random access preamble transmission powers of the UE 740 can be expressed as denoted by reference numbers 791, 792, and 793, where reference number 792 denotes the transmit power between the UE 740 and the central antenna 710, reference number 791 denotes the transmit power between the UE 740 and the first distributed antenna 720, and reference number 793 denotes the transmit power between the UE 740 and the second distributed antenna 730.

When the random access preamble is transmitted at a transmit power as denoted by reference number 791, it is assumed that at least the first distributed antenna 720 will receive the random access preamble. When the random access preamble is transmitted at a transmit power as denoted by reference number 792, it is assumed that at least the first distributed antenna 720 and the central antenna 710 will receive the random access preamble. Further, when the random access preamble is transmitted at a transmit power as denoted by reference number 793, it is assumed that each of the first distributed antenna 720, the central antenna 710, and the second distributed antenna 730 will receive the random access preamble.

The central and first and second distributed antennas 710, 720, and 730 are connected to a central controller. Accordingly, when the random access preamble is received through at least one of the antennas, the eNB will receive the random access preamble successfully.

As described above, UE power consumption can be reduced by minimizing the transmit power of the UE 740. A UE transmit power reduction is advantageous reducing system interferences. Therefore, in accordance with an embodiment of the present invention, a method is provided for determining a random access preamble transmit power from a power calculated based on a minimum pathloss among pathloss values (PLs) associated with respective antennas operating in a DAS mode. That is, a UE can determine a random access preamble transmit power using Equation (3) instead of Equation (2).

$$P_{PRACH} = \min\{P_{CMAX}, \text{REAMBLE\_RECEIVED\_TARGET\_POWER} + \min(PL(k))\} \text{[dBm]} \qquad (3)$$

In Equation (3), PL(k) represents the pathloss between the UE and a $k^{th}$ antenna port.

In FIG. 7, reference number 780 denotes a UE random access preamble transmit power obtained using Equation (3), and reference number 790 denotes the pathloss used for determining the random access preamble transmit power.

Figure 8:
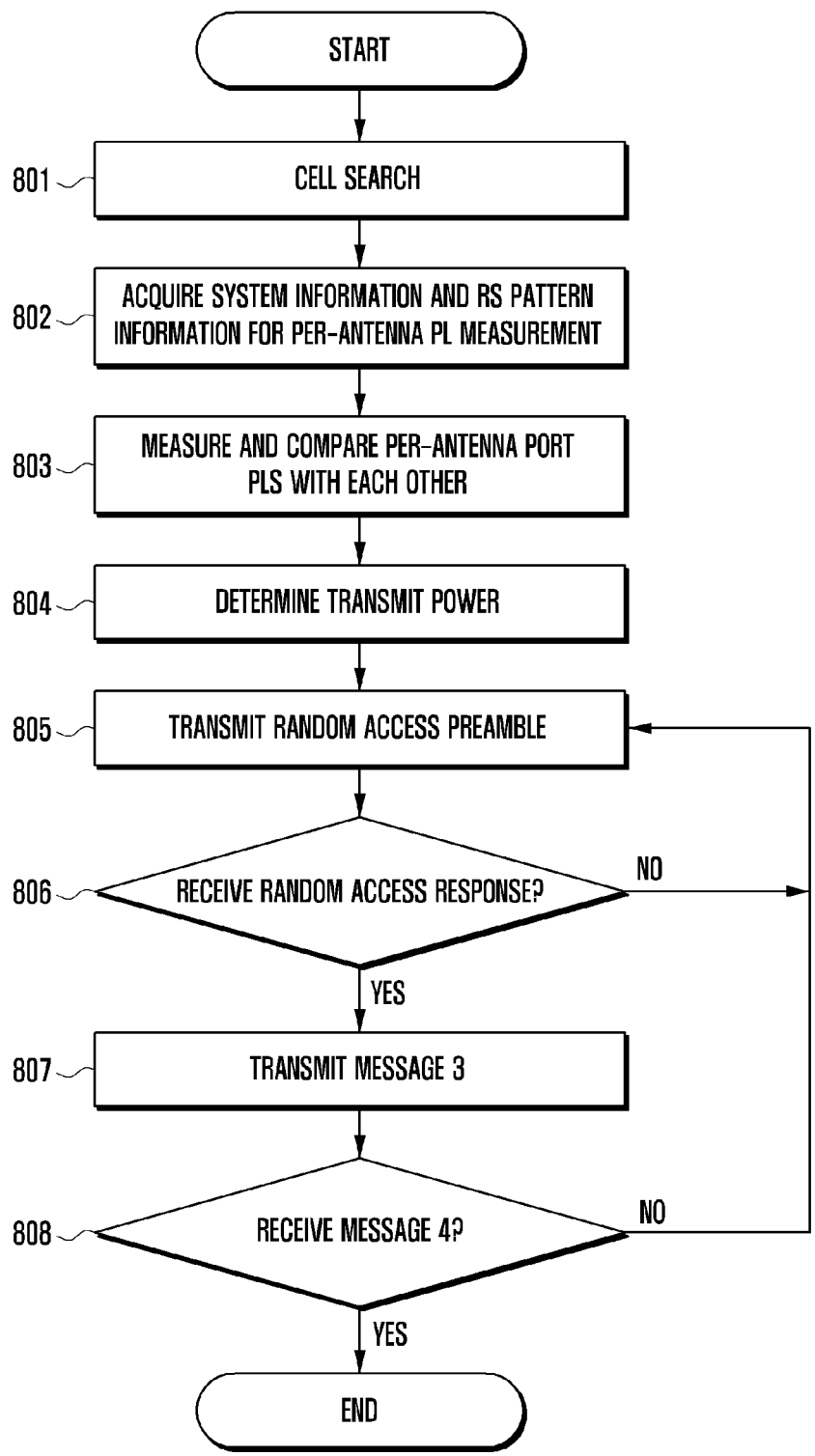
FIG. 8 is a flowchart illustrating a random access preamble transmit power control method of a UE according to an embodiment of the present invention.

FIG. 8 is a flowchart illustrating a random access preamble transmit power control method of a UE according to an embodiment of the present invention.

Referring to FIG. 8, in step 801, the UE performs a cell search to acquire downlink timing, frequency synchronization, and a cell ID. In step 802, the UE receives control information (e.g., system information) from an eNB. The system information includes reference antenna transmit power information for transmitting a random access preamble. The UE acquires basic parameters for communication such as system bandwidth, random access-related parameters, and reference antenna transmit power information including CSI-RS pattern information for measuring pathloss (PL) for each antenna port, in the system information.

In step 803, the UE measures PLs between the UE and the respective antennas by referencing the CSI-RS patterns, and then compares the PLs. In step 804, the UE determines the transmit power required for random access preamble transmission using Equation (3). That is, the UE measures the PLs for each antenna and selects the smallest PL. The UE then determines the transmit power by applying the selected PL value to Equation 3.

In step 805, the UE transmits a random access preamble at the determined transmit power. In step 806, the UE determines whether a random access response is received from the eNB. If no random access response is received within a predetermined time, the procedure returns to step 805 and the UE retransmits the random access preamble. If the random access response is received in step 806, in step 807, the UE transmits a message 3 to the eNB by referencing scheduling information included in the random access response.

In step 808, the UE determines whether a message 4 is received from the eNB. If the message 4 is not received within a predetermined time, the procedure returns to step 805 and the UE retransmits the random access preamble. If, however, the message 4 is received in step 808, the UE completes the random access procedure successfully.

Figure 9:
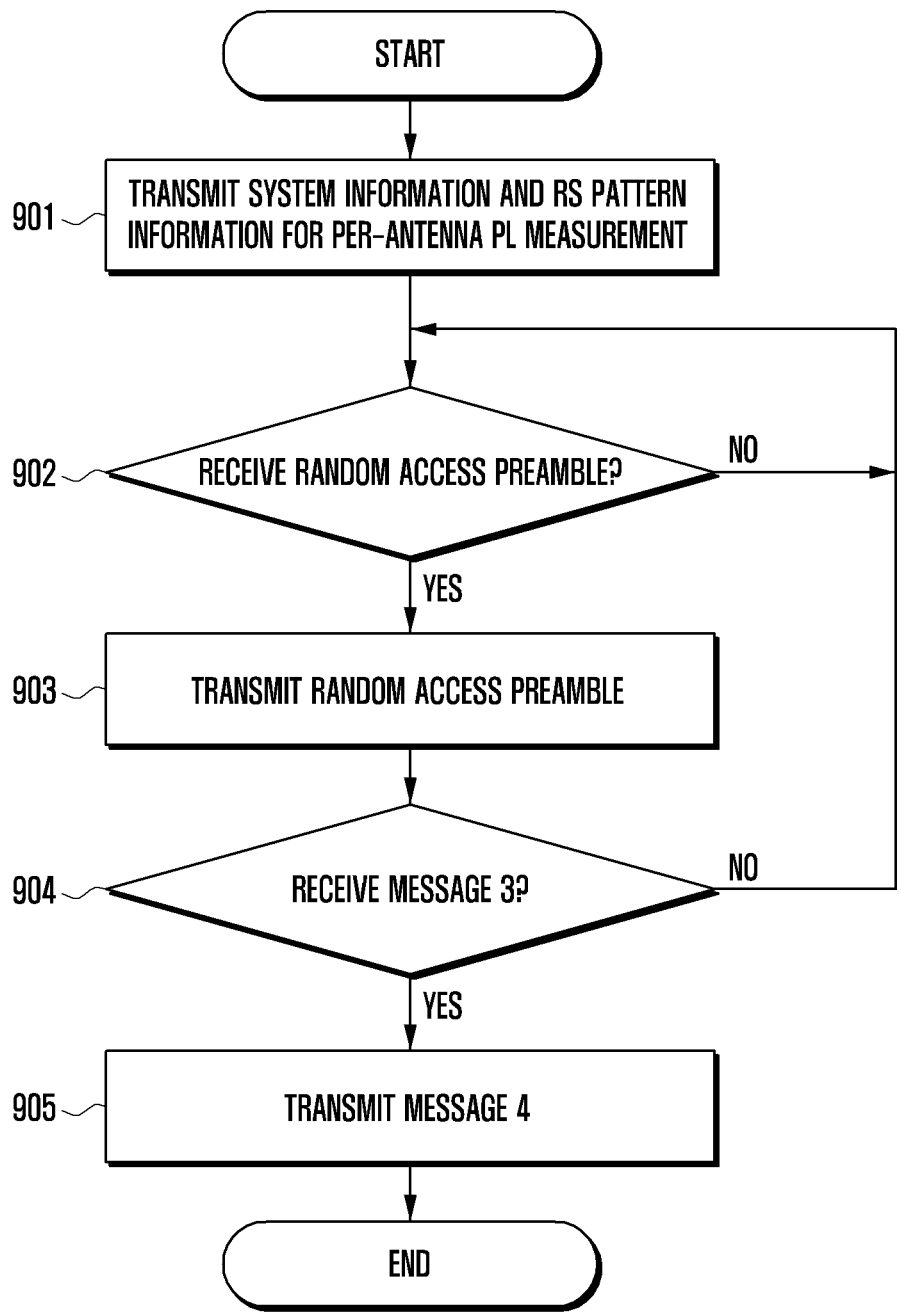
FIG. 9 is a flowchart illustrating a random access preamble transmit power control method of an eNB according to an embodiment of the present invention.

FIG. 9 is a flowchart illustrating a random access preamble transmit power control method of an eNB according to an embodiment of the present invention.

Referring to FIG. 9, in step 901, the eNB transmits, to a UE, communication-related basic parameters such as system information, random access-related parameters, and per-antenna power CSI-RS pattern information. In step 902, the eNB determines whether a random access preamble is received form the UE. If the random access preamble is not received within a predetermined time, the procedure returns to step 902 and the eNB waits to receive a random access preamble.

If the random access preamble is received, in step 903, the eNB transmits, to the UE, a random access response including a time alignment command and scheduling information determined based on the information included in the random access preamble. In step 904, the eNB determines whether a message 3 is received from the UE. If the message 3 is received successfully, the eNB transmits a message 4 to the UE. However, if the message 3 is not received, the procedure returns to step 902 and the eNB waits to receive another random access preamble.

Alternatively, the eNB can notify the UE of a random access preamble to be used. In this case, the random access preamble designated by the eNB is referred to as dedicated random access preamble. In a random access process using a dedicated random access preamble, there is no probability of collision among random access preambles transmitted by different UEs. Accordingly, steps 807 and 808 in FIG. 8 and steps 904 and 905 in FIG. 9 can be omitted.

Additionally, the random access procedure also can be triggered in a handover as a cell switching process of the UE. More specifically, if the eNB commands the UE to perform a handover from cell A to Cell B, the UE performs random access to the cell B and then performs the operations for communication in the cell B. In this case, the eNB provides the UE with information about cell A and cell B and CSI-RS pattern information set for PL measurement for each antenna in cell A and cell B.

For example, the eNB sends the UE the CSI-RS pattern information set={CSI-RS pattern information #1, CSI-RS pattern information #2, CSI-RS pattern information #3, CSI-RS pattern information #4, CSI-RS pattern information #5, CSI-RS pattern information #6}. The eNB also notifies the UE of the CSI-RS pattern to be used for PL measurement through separate signaling.

If the UE is located within cell A, the eNB notifies the UE of the CSI-RS pattern information #1, CSI-RS pattern information #2, and CSI-RS pattern information #3 for the UE's PL measurement in the CSI-RS pattern information set. When the handover from cell A to cell B is commanded, the eNB can notify the UE of CSI-RS pattern information #4, CSI-RS pattern information #5, and CSI-RS pattern information #6 for PL measurement in the CSI-RS pattern information set. Accordingly, the eNB can notify the UE of the CSI-RS pattern information for use in PL measurement for each antenna in the entire system without discrimination among cells. The eNB can also notify the UE of partial CSI-RS pattern information for PL measurement according to a specific situation.

The UE performs PL measurement using the CSI-RS pattern information from the eNB and determines transmit power based on the measurement result. The UE can determine the transmit power using the minimum PL value among PLs of individual antennas corresponding to the UE and the notified CSI-RS patterns as shown above in Equation (3). Also, the transmit power can be determined as an average value of the PLs of respective antennas corresponding to the UE and the CSI-RS patterns.

Figure 10:
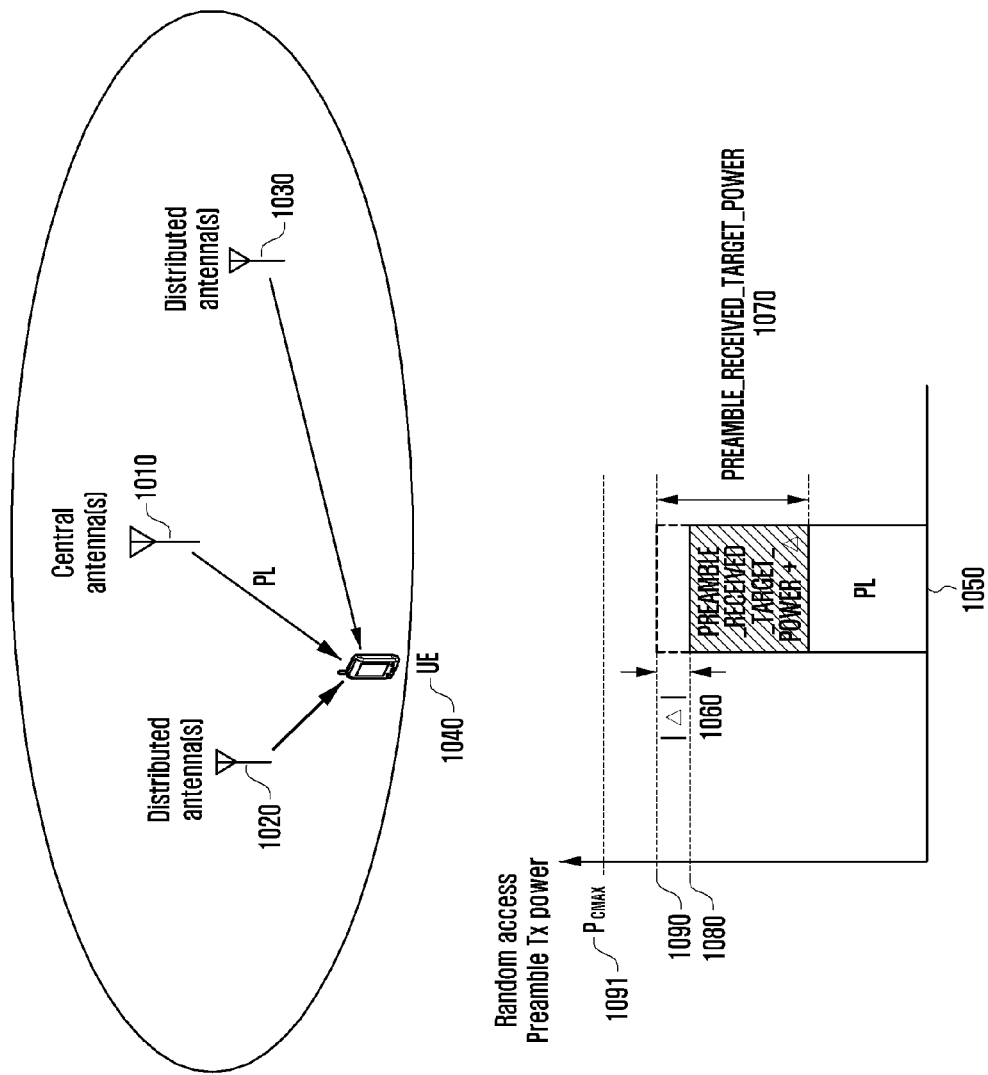
FIG. 10 illustrates transmit power control method in a mobile communication system according to an embodiment of the present invention.

FIG. 10 illustrates a transmit power control method of a UE in a mobile communication system according to an embodiment of the present invention. Specifically, FIG. 10 illustrates a method for determining a random access preamble transmit power using parameters for compensating for a channel condition between a UE and a predetermined antenna signaled by an eNB.

Referring to FIG. 10, a cell includes a central antenna 1010 and first and second distributed antennas 1020 and 1030 for communication with a UE 1040. The central antennal 1010 and the first and second antennas 1020 and 1030 transmit CSI-RS in different patterns. That is, the central antenna 1010 is mapped to C-port, the first distributed antenna 1020 to D-port #1, and the second distributed antenna 1030 to D-port #2. The central and first and second distributed antennas 1010, 2030, and 2030 are connected to a central controller of the eNB.

In FIG. 10, the UE measures pathloss between the UE and the C-port covering the entire cell area under the assumption that the UE performs pathloss measurement on a single antenna. The eNB signals an additional power control parameter Δ for adjusting a random access preamble transmit power of the UE based on a location of the UE. The UE determines the random access preamble transmit power according to Equation (4).

$$P_{PRACH} = \min\{P_{CMAX}, \text{PREAMBLE\_RECEIVED\_TARGET\_POWER} + PL + \Delta\}[\text{dBm}] \quad (4)$$

In Equation (4), PCMAX represents a maximum UE output power determined based on a UE class and higher layer signaling configuration, PREAMBLE_RECEIVED_TARGET_POWER represents a random access preamble reception power required for the eNB to receive the random access preamble, which is determined based on the higher layer signal parameters, PL represents pathloss between the eNB and the UE, and Δ represents an additional power control parameter for adjusting the random access preamble transmit power of the UE.

In FIG. 10, reference number 1050 denotes an example of determining the transmit power 1080 by adjusting a UE random access preamble transmit power calculated using Equation (4) with the additional power control parameter Δ 1060. Here, Δ 1060 is the power control parameter generated in association with an antenna communicating with the UE (for example, in association with a nearest antenna to the UE), based on the UE location. Δ 1060 can be set to 0 or a negative value.

If Equation (2) is used, the random access preamble transmit power is calculated as denoted by reference number 1090. Accordingly, the random access preamble transmit power calculated by Equation (4), i.e., by reflecting Δ1060, is less than the value calculated by Equation (2), thereby reducing power consumption.

Figure 11:
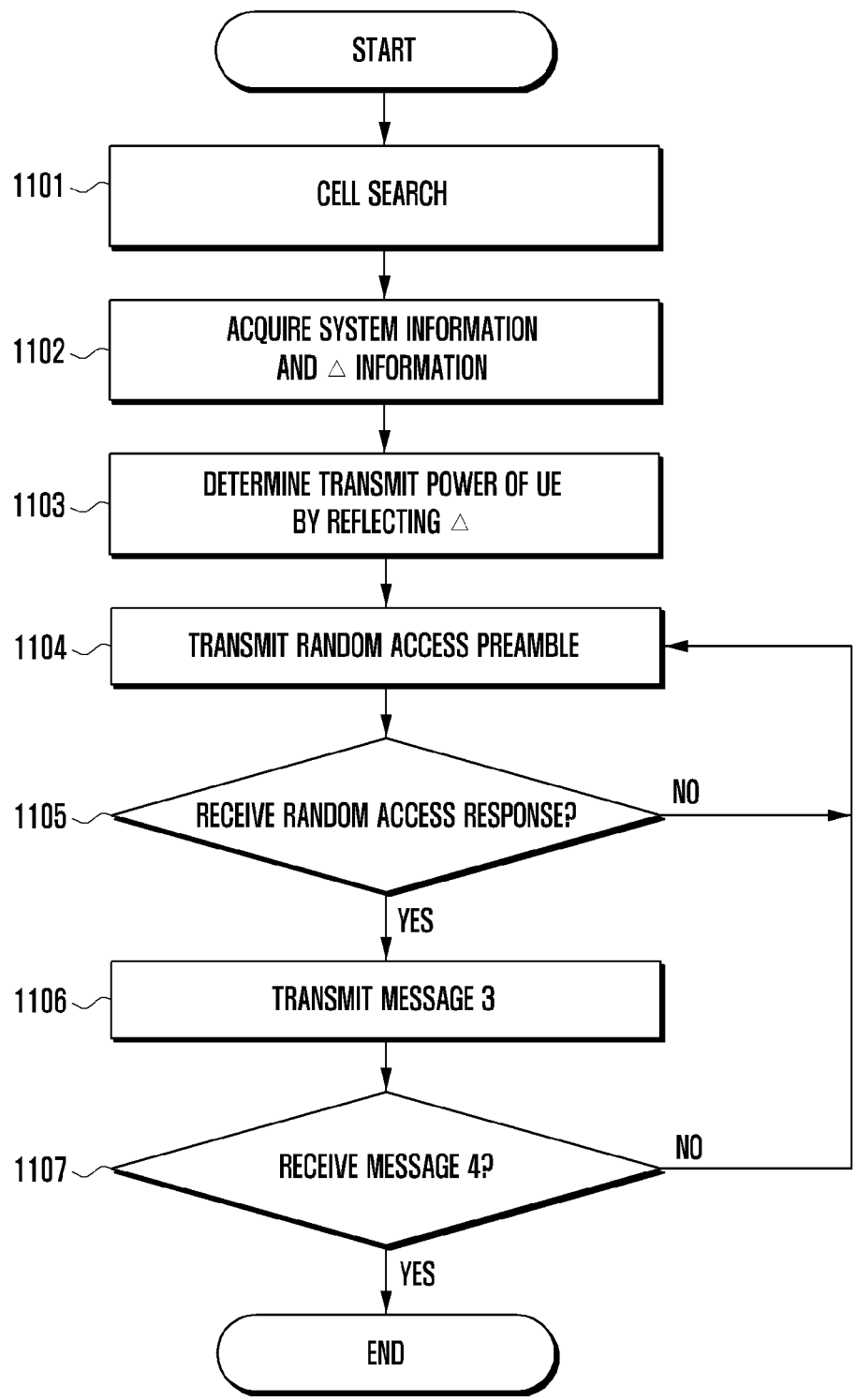
FIG. 11 is a flowchart illustrating a random access preamble transmit power control method of a UE according to an embodiment of the present invention.

FIG. 11 is a flowchart illustrating a random access preamble transmit power control method of a UE according to an embodiment of the present invention.

Referring to FIG. 11, in step 1101, the UE performs a cell search to acquire downlink timing, frequency synchronization, and a cell ID. In step 1102, the UE receives system information including reference antenna transmit power information for random access preamble transmission from an eNB. The UE acquires basic parameters for communication such as system bandwidth, random access-related parameters, and Δ for adjusting random access preamble transmit power as reference antenna transmission power information. As described above, Δ is a parameter for controlling the transmit power in association with the antenna nearest to the UE location which is checked by the eNB.

In step 1103, the UE determines the transmit power required for random access preamble transmission using Equation (4) with the random access-related parameters, the power control parameter Δ for adjusting the random access preamble transmit power, and the pathloss measured for C-port. In step 1104, the UE transmits the random access preamble at the transmit power level.

In step 1105, the UE determines whether a random access response is received form the eNB. If the random access response is not received within a predetermined time, the procedure returns to step 1104 and the UE retransmits the random access preamble. If the random access response is received in step 1105, in step 1106, the UE transmits a message 3, according to the scheduling information included in the random access response.

In step 1107, the UE determines whether a message 4 is received. If the message 4 is not received within a predetermined time, the procedure returns to step 1104 and the UE retransmits the random access preamble. However, if the message 4 is received in step 1107, the UE completes the random access procedure successfully.

Figure 12:
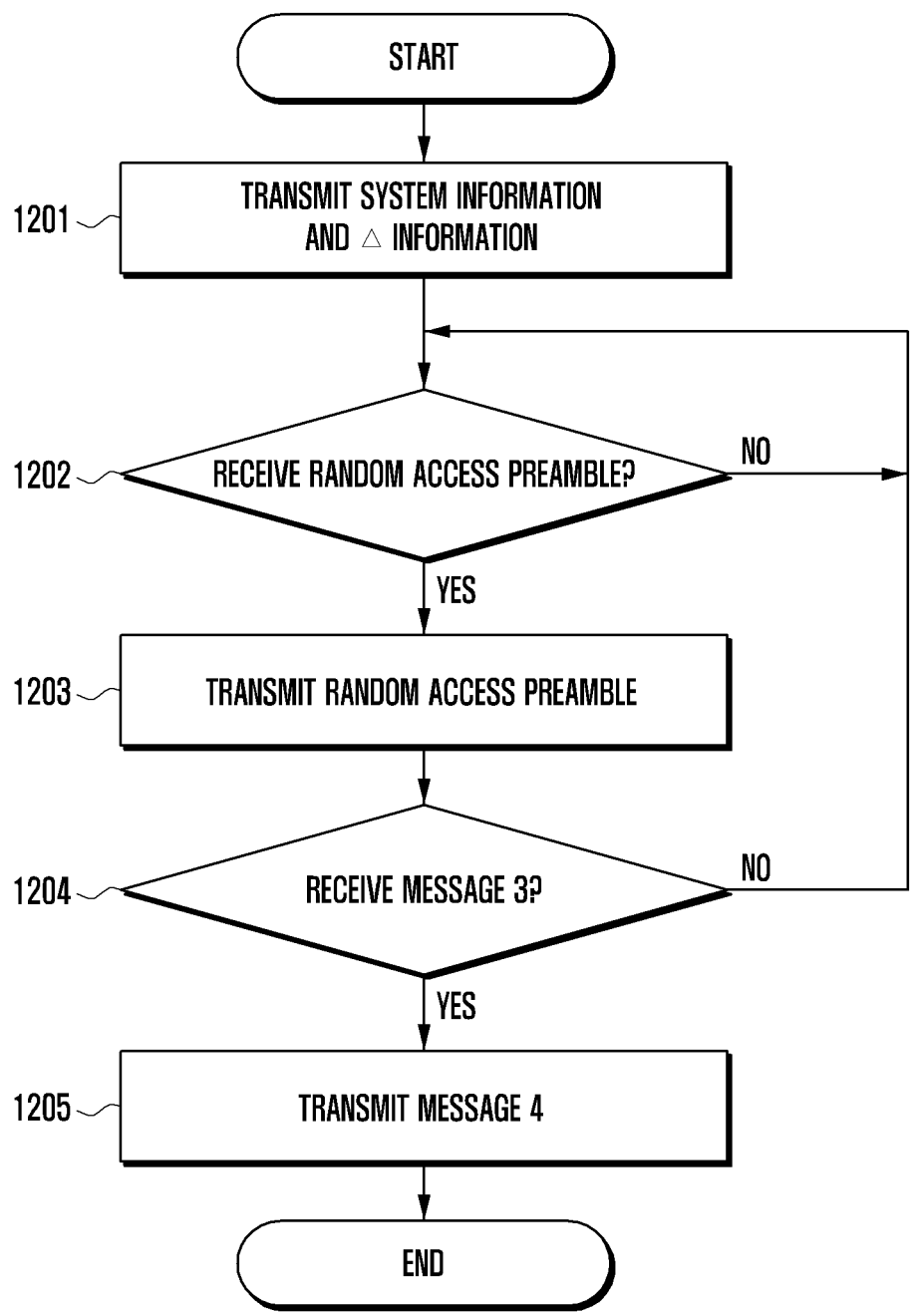
FIG. 12 is a flowchart illustrating a random access preamble transmit power control method of an eNB according to an embodiment of the present invention.

FIG. 12 is a flowchart illustrating a random access preamble transmit power control method of an eNB according to an embodiment of the present invention.

Referring to FIG. 12, in step 1201, the eNB transmits, to a UE, communication-related basic parameters such as the system information, random access-related parameters, and random access preamble transmit power control parameter Δ. In step 1202, the eNB determines whether a random access preamble is received. Basically, the eNB waits until the random access preamble is received at step 1202.

If the random access preamble is received at step 1202, in step 1203, the eNB transmits, to the UE, a random access response including a time alignment command and scheduling information determined based on the information included in the random access preamble.

In step 1204, the eNB determines whether a message 3 is received. If the message 3 is not received, the procedure to step 1202 and the eNB waits to receives another random access preamble. However, if the message 3 is received in step 1204, the eNB transmits a message 4 to the UE in step 1205. If the UE receives the message 4 successfully, the random access procedure is terminated.

Alternatively, the eNB can notify the UE of the random access preamble to be used, i.e., a dedicated random access preamble can be used. In a random access process using a dedicated random access preamble, Δ is not signaled explicitly but notified implicitly with the transmission of the dedicated random access preamble. For example, the relationship between the dedicated random access preamble and Δ can be defined as follows and shared by the eNB and UE.

Dedicated random access preamble 1~ dedicated random access preamble k1→Δ1

Dedicated random access preamble k1+1~ dedicated random access preamble k2→Δ2

Dedicated random access preamble k2+1~ dedicated random access preamble k3→Δ3

In the random access procedure using the dedicated random access preamble, because there is no probability of collision among random access preambles transmitted by different UEs, steps 1106 and 1107 in FIG. 11 and steps 1204 and 1205 in FIG. 12 can be omitted.

Figure 13:
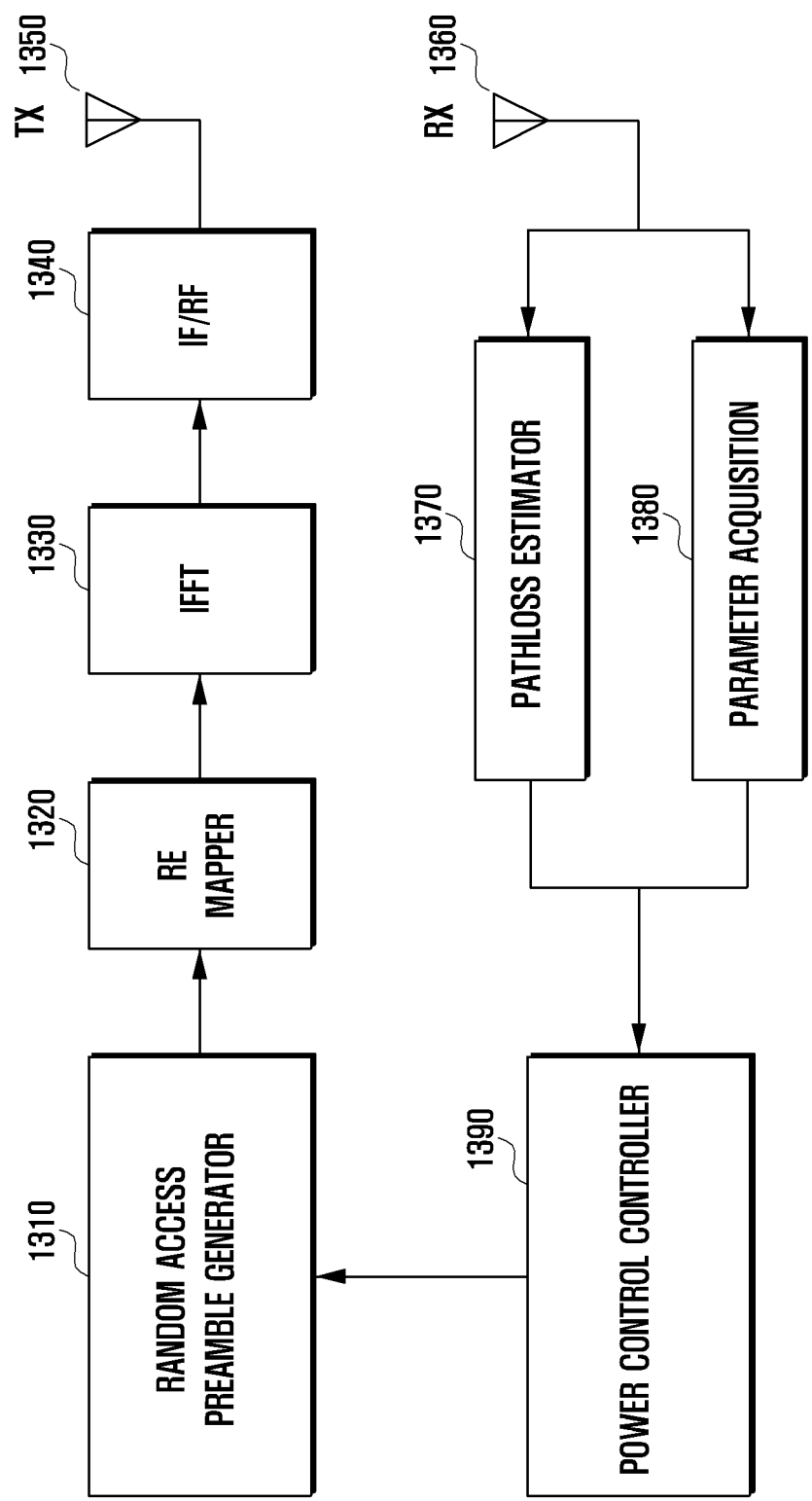
FIG. 13 illustrates a UE according to an embodiment of the present invention.

FIG. 13 illustrates a UE according to an embodiment of the present invention.

Referring to FIG. 13, the UE includes a random access preamble generator 1310 for generating the random access preamble, a Resource Element (RE) mapper 1320 for mapping a signal to be transmitted to REs, an Inverse Fast Fourier Transform (IFFT) processor 1330 for performing IFFT on the signal output from the RE mapper 1320, an Intermediate Frequency/Radio Frequency (IF/RF) processor 1340 for performing IF/RF conversion on the signal output from the IFFT processor 1330, and a transmitter 1350 for transmitting the radio signal output by the IF/RF processor 1340.

The UE receives the system information from the eNB through the receiver 1360. The system information includes the basic communication parameters such as the system bandwidth, per-antenna CSI-RS pattern information on the random access-related parameters and reference antenna transmit power, and random access preamble transmit power control information Δ.

The UE checks the pathloss between the eNB and the UE and the pathloss between each antenna and the UE using a pathloss estimator 1370. The UE also acquires the random access-related parameter from the eNB using a parameter acquisition unit 1380.

Thereafter, the UE adjusts the random access preamble transmit power of the UE using the checked pathloss and random access-related parameters using a power control controller 1390. Basically, the UE determines the random access preamble transmit power as described above, and the power control controller 1390 controls the random access preamble generator 1310 and/or the IF/RF processor 1340 to adjust the random access preamble transmit power.

Figure 14:
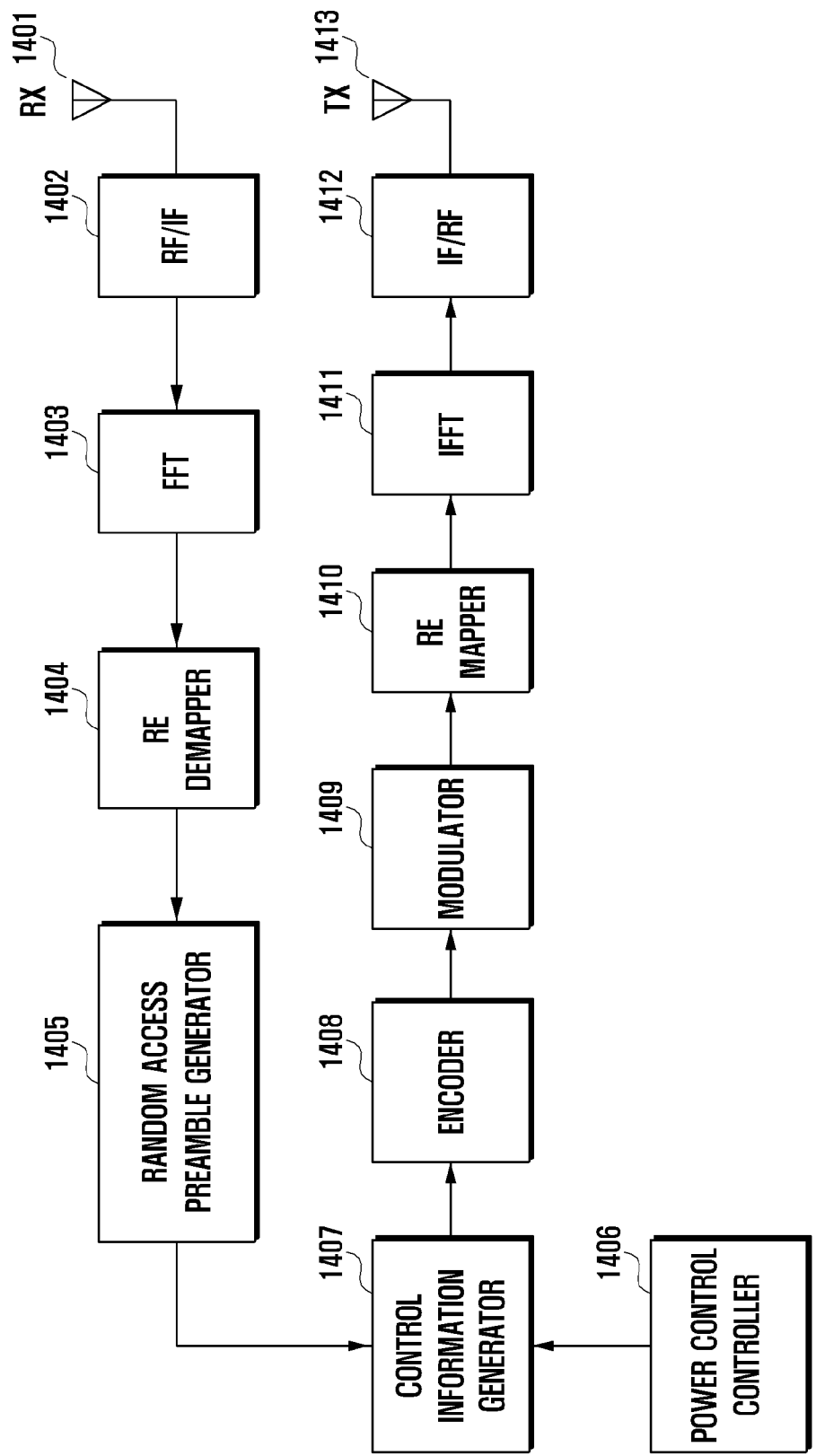
FIG. 14 illustrates an eNB according to an embodiment of the present invention.

FIG. 14 illustrates an eNB according to an embodiment of the present invention.

Referring to FIG. 14, the eNB includes a receiver 1401, an RF/IF processor 1402 for performing RF/IF conversion on a signal received by the receiver 1401, a Fast Fourier Transform (FFT) processor 1403 for performing FFT on the output of the RF/IF processor 1402, an RE demapper 1404, a random access preamble detector 1405, and a power control controller 1406.

The power control controller 1406 generates a power control parameter for random access preamble transmission according to the location of the UE to a control information generator 1407. The control information generator 1407 generates control information based on the power control parameter input by the power control controller 1406 and the information provided by the random access preamble detector 1405 on whether the random access preamble is received successfully. The control information is coded with an error correction code by an encoder 1408, is modulated to a modulation symbol by a modulator 1409, and is then mapped to the time-frequency resource by an RE mapper 1410. The signal is further processed by an IF/RF processor 1412 and then transmitted to the UE by a transmitter 1413.

Random access preamble transmit power control methods and apparatuses according to the above-described embodiments of the present invention are capable of efficiently controlling the random access preamble transmit power in a DAS-based mobile communication system, thereby reducing power consumption and interference.

Although certain embodiments of the present invention have been described in detail hereinabove, it should be clearly understood that many variations and/or modifications of the basic inventive concepts taught herein, which may appear to those skilled in the present art, will still fall within the spirit and scope of the present invention, as defined in the appended claims and their equivalents.

What is claimed is:

1. A power control method for random access of a terminal in a mobile communication system, the method comprising:
    receiving, by the terminal, reference signal information for a plurality of reference signals for a plurality of antenna ports via a higher layer;
    measuring a plurality of pathlosses for the plurality of the antenna ports of a base station, using the plurality of the reference signals and reference signal power information included in the reference signal information;
    calculating a transmit power of a random access preamble using a pathloss having a smallest value among the measured pathlosses; and
    transmitting the random access preamble using the calculated transmit power.

2. The method of claim 1, wherein the reference signal information relates to Channel State Information Reference Signal (CSI-RS) per antenna port.

3. The method of claim 2, wherein the reference signal information comprises CSI-RS pattern information for measuring pathloss for each antenna port of the base station.

4. The method of claim 1, wherein the mobile communication system is configured with a distributed antenna system.

5. The method of claim 1, wherein each of the reference signals is received via each of the antenna ports of the base station.

6. The method of claim 1, wherein the transmit power of the random access preamble ($P_{PRACH}$) is calculated using:

$$P_{PRACH}=\min\{P_{CMAX}, \text{PREAMBLE\_RECEIVED\_TARGET\_POWER}+\min(PL(k))\}[dBm],$$

wherein $P_{CMAX}$ represents a maximum User Equipment (UE) output power based on a UE class and higher layer signaling configuration, PREAMBLE_RECEIVED_TARGET_POWER represents a random access preamble reception power required for the base station to receive the random access preamble, determined based on the higher layer signal parameters, and PL(k) represents the pathloss between the UE and a $k^{th}$ antenna port.

7. An apparatus for controlling transmit power in a mobile terminal, the apparatus comprising:
    a receiver configured to receive reference signal information for a plurality of reference signals for a plurality of antenna ports via a higher layer;
    a power control controller configured to measure a plurality of pathlosses for the plurality of the antenna ports of a base station, using the plurality of the reference signals and reference signal power information included in the reference signal information, to calculate a transmit power of a random access preamble using a pathloss having a smallest value among the measured pathlosses, and to transmit the random access preamble using the calculated transmit power.

8. The apparatus of claim 7, wherein the reference signal information relates to Channel State Information Reference Signal (CSI-RS) per antenna port.

9. The apparatus of claim 8, wherein the reference signal information comprises CSI-RS pattern information for measuring pathloss for each antenna port of the base station.

10. The apparatus of claim 7, wherein the mobile communication system is configured with a distributed antenna system.

11. The apparatus of claim 7, wherein each of the reference signals is received via each of the antenna ports of the base station.

12. The apparatus of claim 7, wherein the transmit power of the random access preamble($P_{PRACH}$) is calculated using:

$$P_{PRACH}=\min\{P_{CMAX}, \text{PREAMBLE\_RECEIVED\_TARGET\_POWER}+\min(PL(k))\}[dBm],$$

wherein $P_{CMAX}$ represents a maximum User Equipment (UE) output power based on a UE class and higher layer signaling configuration, PREAMBLE_RECEIVED_TARGET_POWER represents a random access preamble reception power required for the base station to receive the random access preamble, determined based on the higher layer signal parameters, and PL(k) represents the pathloss between the UE and a $k^{th}$ antenna port.

13. A random access method of a base station in a mobile communication system, the method comprising:
    transmitting, by the base station to a terminal, reference signal information for a plurality of reference signals for a plurality of antenna ports via a higher layer; and
    receiving a random access preamble from the terminal,
    wherein a plurality of pathlosses for the plurality of the antenna ports of a base station is measured, by the terminal, using the plurality of the reference signals and reference signal power information included in the reference signal information, and
    wherein a transmit power of the random access preamble is calculated, by the terminal, using a pathloss having a smallest value among the measured pathlosses.

14. The method of claim 13, wherein the reference signal information relates to Channel State Information Reference Signal (CSI-RS) per antenna,
    wherein the reference signal information comprises CSI-RS pattern information for measuring pathloss for each antenna port of the base station, and
    wherein the mobile communication system is configured with a distributed antenna system.

15. The method of claim 13, wherein each of the reference signals is received via each of the antenna ports of the base station, and
    wherein the transmit power of the random access preamble($P_{PRACH}$) is calculated using:

$$P_{PRACH}=\min\{P_{CMAX}, \text{PREAMBLE\_RECEIVED\_TARGET\_POWER}+\min(PL(k))\}[dBm],$$

wherein $P_{CMAX}$ represents a maximum User Equipment (UE) output power based on a UE class and higher layer signaling configuration, PREAMBLE_RECEIVED_TARGET_POWER represents a random access preamble reception power required for the base station to receive the random access preamble, determined based on the higher layer signal parameters, and PL(k) represents the pathloss between the UE and a $k^{th}$ antenna port.

16. A base station that performs random access in a mobile communication system, the base station comprising:
    a transceiver that transceives signals with a terminal; and
    a power control controller configured to transmit reference signal information for a plurality of reference signals for a plurality of antenna ports to the terminal via a higher layer, and receive a random access preamble from the terminal,
    wherein a plurality of pathlosses for the plurality of the antenna ports of a base station is measured, by the terminal, using the plurality of the reference signals and reference signal power information included in the reference signal information, and
    wherein a transmit power of the random access preamble is calculated, by the terminal, using a pathloss having a smallest value among the measured pathlosses.

17. The base station of claim 16, wherein the reference signal information relates to Channel State Information Reference Signal (CSI-RS) per antenna,
    wherein the reference signal information comprises CSI-RS pattern information for measuring pathloss for each antenna port of the base station, and
    wherein the mobile communication system is configured with a distributed antenna system.

18. The base station of claim 16, wherein each of the reference signals is received via each of the antenna ports of the base station, and
    wherein the transmit power of the random access preamble($P_{PRACH}$) is calculated using:

$$P_{PRACH}=\min\{P_{CMAX}, \text{PREAMBLE\_RECEIVED\_TARGET\_POWER}+\min(PL(k))\}[dBm],$$

wherein $P_{CMAX}$ represents a maximum User Equipment(UE) output power based on a UE class and higher layer signaling configuration, PREAMBLE_RECEIVED_TARGET_POWER represents a random access preamble reception power required for the base station to receive the random access preamble, determined based on the higher layer signal parameters, and PL(k) represents the pathloss between the UE and a $k^{th}$ antenna port.

* * * * *